Aug. 27, 1968      R. I. HOMIER      3,398,986
SEAT POSITIONING MECHANISM
Filed Dec. 8, 1966
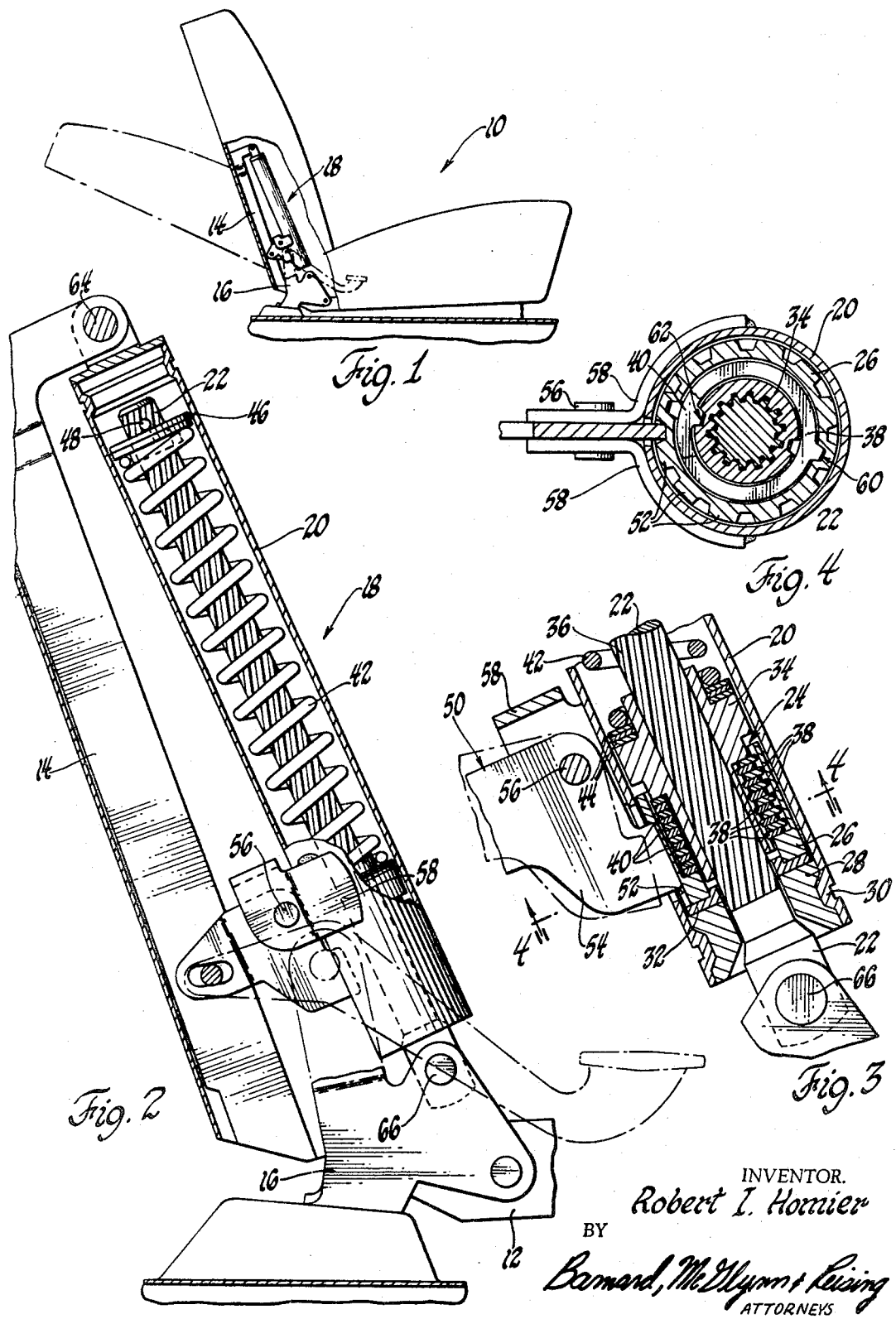
INVENTOR.
Robert I. Homier
BY
Barnard, McGlynn & Reising
ATTORNEYS

United States Patent Office 3,398,986
Patented Aug. 27, 1968

3,398,986
SEAT POSITIONING MECHANISM
Robert I. Homier, Farmington, Mich., assignor, by mesne assignments, to Lear Siegler, Inc., Santa Monica, Calif., a corporation of Delaware
Filed Dec. 8, 1966, Ser. No. 600,099
9 Claims. (Cl. 297—355)

ABSTRACT OF THE DISCLOSURE

A positioning mechanism including a housing and a threaded rod disposed in the housing and extending out of the housing. A threaded nut is disposed in the housing and threadedly engages the rod. A spring is disposed between one end of the rod and the threaded nut to urge the rod into the housing. A sleeve-like member is rotatably supported in the housing and a plurality of discs are operatively connected to the sleeve-like member. A second plurality of discs are operatively connected to the nut and are disposed among the discs operatively attached to the sleeve-like member. The sleeve-like member has a plurality of teeth disposed about the circumference thereof and a control means comprising a latch flange normally engages the teeth to prevent rotation of the sleeve-like member. The spring urges the nut toward the sleeve-like member so that the discs are urged together to prevent relative rotation between the sleeve-like member and the nut thus preventing relative movement between the rod and the housing. Upon disengagement of the latch flange, the sleeve-like member is free to rotate which allows the nut to rotate and move along the rod, thus allowing relative movement between the rod and the housing. Furthermore, when the rod is urged into the housing, such as by forcing the seat back to pivot from a reclined position toward an upright position, the nut is moved axially to move the discs apart so that the discs are free to rotate relative to one another whereby the nut may rotate on the rod as the sleeve-like member is prevented from rotating by the latch flange.

---

Various positioning mechanisms which may be utilized to control the reclining movement of a seat back are known in the prior art. Many such positioning mechanisms are power operated by way of an electric motor or the like. Seat assemblies with which the positioning mechanism of the instant invention has particular utility are utilized in vehicles such as automobiles, trucks, buses and the like.

One of the problems associated with the prior art positioning mechanisms is the accomplishment of the mode of operation wherein the positioning mechanism may be manually actuated to allow the seat back to pivot in either direction yet allows the seat back to be pivoted from a reclined position toward the upright position without manually actuating the positioning mechanism. Such a mode of operation or operating characteristic is important when a seat assembly is used in airliners or buses because in many instances an individual may desire to move the seat back of a forward empty seat from a reclined position toward the upright position without actuating the positioning mechanism. This mode of operation or operating characteristic has, of course, been accomplished in some prior art positioning mechanism; however, there still remains a need for improved and/or alternative positioning mechanisms.

Accordingly, it is an object and feature of this invention to provide a novel and unique positioning mechanism adapted for operatively interconnecting a seat frame and a seat back frame of a seat assembly so that the seat back frame may be pivoted relative to the seat frame in either direction upon actuation of the positioning mechanism and whereby the seat back frame may be pivoted from a reclined position to the upright position without manual actuation of the positioning mechanism.

Another object and feature of this invention is to provide a novel and unique positioning mechanism to control the movement between two relatively movable structures and which includes first and second members adapted for linear movement in opposite directions relative to one another and a rotatable disc clutch means operatively interconnecting the members for selectively allowing relative movement between the members in either direction and for allowing relative movement in one direction between the members in response to the members being used to move relative to one another in the one direction.

Other objects and attendant advantages of the present invention will be readily appreciated as the same becomes better understood by reference to the following detailed description when considered in connection with the accompanying drawing wherein:

FIGURE 1 is a side elevational view partially broken away of a seat assembly employing a preferred embodiment of the positioning mechanism of the instant invention;

FIGURE 2 is an enlarged fragmentary view partially broken away showing the preferred embodiment of the positioning mechanism of the instant invention;

FIGURE 3 is an enlarged cross-sectional view partially broken away of the preferred embodiment of the positioning mechanism of the instant invention; and FIGURE 4 is a cross-sectional view taken substantially along lines 4—4 of FIGURE 3.

Referring now to the drawing wherein like numerals indicate like or corresponding parts throughout the several views, a seat assembly is generally shown at 10. The seat assembly includes a seat frame 12, a seat back frame 14, and means comprising the intermediate frame 16 to pivotally connect the seat back frame 14 to the seat frame 12 for allowing the seat back frame 14 to pivot relative to the seat frame 12 between an upright position (as shown in full lines in FIGURE 1) and various reclined positions (one of which is shown in phantom in FIGURE 1).

A preferred embodiment of the positioning mechanism of the instant invention is generally indicated at 18 and is adapted for interconnecting two relatively movable structures, such as the seat frame 12 and the seat back frame 14, to control the relative movement therebetween. The positioning mechanism 18 includes a first member which comprises the housing 20 and a second member which comprises the threaded rod 22. The housing 20 and the rod 22 are adapted for linear movement in opposite directions relative to one another. The positioning mechanism 18 further includes rotatable disc clutch means generally indicated at 24 and operatively interconnecting the housing 20 and the rod 22 for selectively allowing relative movement between the housing 20 and the rod 22 in either direction and for allowing relative movement in one direction between the housing 20 and the rod 22 in response to the housing 20 and rod 22 being urged to move relative to one another in the direction where the rod 22 is urged to move into the housing 20.

The clutch means 24 includes a first element which comprises the sleeve-like member 26 rotatably supported by the housing 20. The housing 20 includes a plug 28 which is retained in position by the crimped portion 30. There is also included a bearing 32 which rotatably supports the sleeve-like member 26. The rotatable disc clutch means 24 also includes a second element comprising the nut 34 which threadedly engages the rod 22, the threads 36 being on a long lead. A first plurality of discs 38 are operatively connected to the sleeve-like member 26 for rotation therewith. A second plurality of discs 40 are operatively connected to the nut 34 for rotation therewith. The second plurality of discs 40 are disposed alternately among the first plurality of discs 38.

There is also included a biasing means comprising the spring 42 for urging the discs 38 and 40 together to prevent relative rotation between the sleeve-like member 26 and the nut 34 and for allowing the discs 38 and 40 to move apart and rotate relative to one another as the rod 22 is moved relative to the housing 20 in a direction where the rod 22 is moved into the housing 20. There is also included on the rod 22 a retaining means comprising the washers 46 and pin 48 against which the spring 42 reacts. The nut 34 provides a shoulder on which the washer-like elements 44 are disposed and upon which the other end of the spring 42 is disposed. The washer-like members 44 are preferably of a material which facilitates relative rotation between the nut 34 and the end of the spring 42.

The rotatable disc clutch means also includes a control means generally indicated at 50 for selectively allowing rotation of the sleeve-like member 26 so that the rod 22 may move relative to the housing 20 in either direction. More specifically, there is included a plurality of teeth 52 disposed circumferentially about the sleeve-like member 26 and a latch flange 54 which is selectively movable out of engagement with the teeth 52 to allow rotation of the sleeve-like member 26. The latch flange 54 is shown moved out of engagement with the teeth 52 in phantom in FIGURE 3. The latch flange 54 is pivotally connected to the housing 20 by the pin 56 which is supported by a bracket 58, the bracket 58 being welded to and forming a part of the housing 20. The latch flange 54 may be moved by any appropriate device or lever such as the lever shown in phantom in FIGURE 2.

As more specifically disclosed in FIGURE 4, the first plurality of discs 38 are operatively connected to the sleeve-like member 26 by a tongue and groove arrangement generally indicated at 60. The tongue and groove arrangement 60 allows the discs 38 to move relative to the sleeve-like member 26 in a direction which is parallel to the axis of rotation of the sleeve-like member 26, i.e., axially of the rod 22. Likewise, the second plurality of discs 40 are operatively connected to the nut 34 by a tongue and groove arrangement generally indicated at 62. The tongue and groove arrangement 62 also allows the disc 40 to move relative to the nut 34 in a direction parallel to the axis of rotation, i.e., axially of the rod 22. In either case, any appropriate number of such tongue and groove arrangements may be utilized in conjunction with the discs 38 and 40.

The housing 20 is pivotally connected to the seat back frame 14 by the pin 64 and the rod 22 is pivotally connected to the seat frame 12 by way of the pin 66 and intermediate frame 16. Once the positioning mechanism 18 is thus attached to a seat assembly, the seat back frame 14 may be moved to a reclined position by manually moving the latch flange 54 out of engagement with the teeth 52 on the sleeve-like member 26. Movement of the latch flange 54 out of engagement with the teeth 52 allows the sleeve-like member 26 to rotate which in turn allows the nut 34 to rotate. As the nut 34 rotates, it moves along the threaded rod 22, thus allowing the seat back frame 14 to pivot in either direction relative to the seat frame 12. If the seat back frame is in a reclined position, such as that shown in phantom in FIGURE 1, it may be moved to the upright position without manually actuating the latch flange 54. This is accomplished by pushing upward and forward on the seat back frame 14. Such a force moves the rod 22 into the housing 20 which in turn moves the nut 34 axially away from the sleeve-like member 26 to separate the discs 38 and 40 which in turn allows the nut 34 to rotate even though the sleeve-like member 26 is being prevented from rotating by the latch flange 54. Thus, the rod 22 moves into the housing 20 as the seat back frame 14 pivots from a reclined position toward an upright position. Once the seat back frame 14 has been pivoted to the desired position, the spring 42 again forces the nut 34 toward the sleeve-like member 26 to urge the discs 38 and 40 together to prevent relative rotation between the sleeve-like member 26 and the nut 34.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which exclusive property or privilege is claimed are defined as follows:

1. A positioning mechanism adapted for interconnecting two relatively movable structures to control the relative movement therebetween and comprising; first and second members adapted for linear movement in opposite directions relative to one another, and rotatable disc clutch means operatively interconnecting said members for selectively allowing relative movement between said members in either direction and for allowing relative movement in one direction between said members in response to said members being urged to move relative to one another in said one direction, said disc clutch means including a first element rotatably supported by said first member, a second element threadedly engaging said second member, a first plurality of discs operatively connected to said first element for rotation therewith, a second plurality of discs operatively connected to said second element for rotation therewith, said second plurality of discs being disposed among said first plurality of discs, biasing means urging said discs together to prevent relative rotation between said first and second elements and for allowing said discs to move apart and rotate relative to one another as said first and second members are moved relative to one another in said one direction, and control means for selectively allowing rotation of said first element so that said members may move relative to one another in either direction.

2. A mechanism as set forth in claim 1 in combination with a seat assembly including a seat frame, a seat back frame, means pivotally connecting said seat back frame to said seat frame for allowing said seat back frame to pivot relative to said seat frame between an upright position and various reclined positions, said first member being pivotally connected to one of said frames and said second member being pivotally connected to the other of said frames for controlling the pivotal movement of said seat back frame relative to said seat frame.

3. A positioning mechnism as set forth in claim 1 wherein said first plurality of discs are operatively connected to said first element by a tongue and groove arrangement which allows said discs to move relative to said first element in a direction parallel to the axis of rotation of said first element and said second plurality of discs are operatively connected to said second element by a tongue and groove arrangement which allows said discs to move relatively to said second element in a direction parallel to said axis of rotation.

4. A positioning mechanism as set forth in claim 3 wherein said second member comprises a threaded rod, a retaining means disposed on a first end of said rod, said biasing means being disposed between said retaining means and said first element.

5. A positioning mechanism as set forth in claim 4 wherein said second member comprises a housing, said first end of said rod being disposed in said housing with the second end of said rod extending out of said housing.

6. A positioning mechanism as set forth in claim 5 wherein said control means includes a plurality of teeth disposed circumferentially about said first element and a latch flange selectively movable out of engagement with said teeth to allow rotation of said first element.

7. A positioning mechanism as set forth in claim 6 wherein said latch flange is pivotally connected to said housing.

8. A positioning mechanism as set forth in claim 7 wherein said biasing means comprises a spring and said second member is a nut providing a shoulder upon which one end of said spring is disposed.

9. The mechanism as set forth in claim 8 in combination with a seat assembly comprising; a seat frame, a seat back frame, means pivotally connecting said seat back frame to said seat frame for allowing said back frame to pivot relative to said seat frame between an upright position and various reclined positions, said housing being pivotally connected to one of said frames and said rod being pivotally connected to the other frame for controlling the pivotal movement of said seat back frame relative to said seat frame.

References Cited

UNITED STATES PATENTS

| | | | |
|---|---|---|---|
| 2,579,305 | 12/1951 | Cushman | 297—361 |
| 2,750,994 | 6/1956 | Howell | 297—375 |
| 3,046,055 | 7/1962 | Martens | 297—361 |
| 3,104,130 | 9/1963 | Martens | 297—355 |
| 3,127,788 | 4/1954 | Martens | 74—586 |
| 3,246,868 | 4/1966 | Martens | 248—355 |
| 3,339,975 | 9/1967 | Posh | 297—361 |

BOBBY R. GAY, *Primary Examiner.*

G. O. FINCH, *Assistant Examiner.*